J. E. CROWELL.
SELF ALIGNING CONNECTING ROD.
APPLICATION FILED AUG. 6, 1919.
1,409,931.
Patented Mar. 21, 1922.
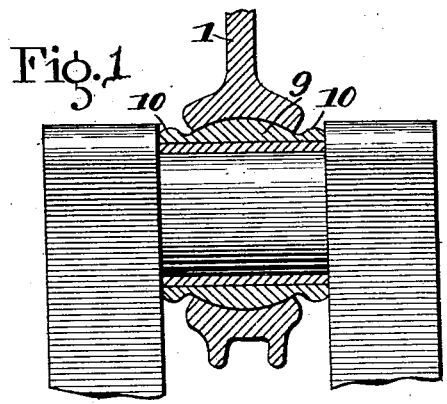
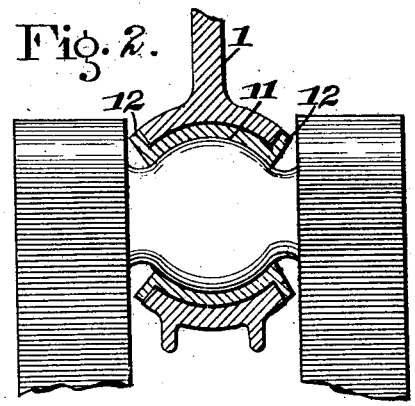
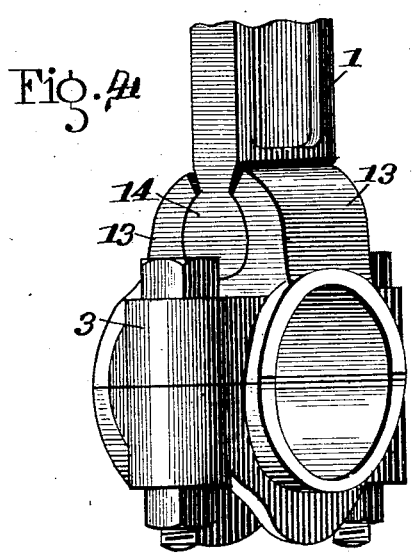
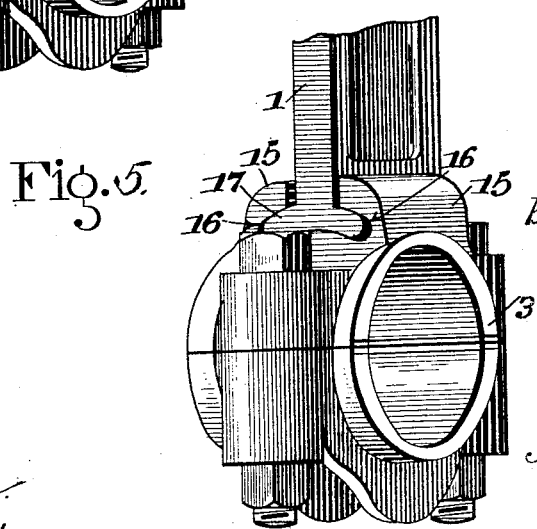
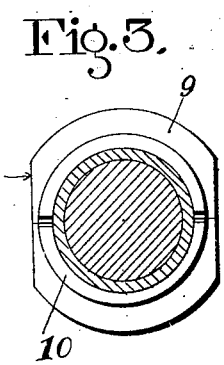
WITNESSES
INVENTOR
John E. Crowell
BY
ATTORNEYS

UNITED STATES PATENT OFFICE.

JOHN E. CROWELL, OF UNION COUNTY, NORTH CAROLINA.

SELF-ALIGNING CONNECTING ROD.

1,409,931.      Specification of Letters Patent.     Patented Mar. 21, 1922.

Application filed August 6, 1919. Serial No. 315,704.

*To all whom it may concern:*

Be it known that I, JOHN E. CROWELL, a citizen of the United States, and a resident of Union County, in the State of North Carolina, have invented certain new and useful Improvements in Self-Aligning Connecting Rods, of which the following is a specification.

My invention relates to improvements in internal combustion engines, as well as other types of engines, and more particularly to the connecting rod structure thereof.

The foremost object of my invention is to provide a flexible connection between the piston and crank shaft so that the piston and connecting rod, in which the flexible connection is located, will always be free to line up with the engine cylinder regardless of any inaccurate alining of the crank shaft in relation to the cylinder, a condition often brought about by badly fitted, or worn bearings, heat-warped cylinder, or torsional deflections of the crank shaft.

A further object of the invention is to provide a connecting rod with a flexible joint, for the purpose of enabling automatic alinement of the piston, connecting rod, and cylinder in case the crank shaft should be warped, which condition would otherwise impose unnatural strains on the parts mentioned.

Other objects and advantages will appear in the following specification, reference being had to the accompanying drawings, in which:

Figure 1 is a detail sectional view illustrating the first modification wherein a ball or swivel joint is made use of so as to enable a free alinement, Figure 2 is a detail sectional view showing the second modification which is substantially the same as that shown in Figure 1, Figure 3 is a detail side elevation of the bushing shown in Figure 1, Figure 4 is a perspective view illustrating a third modification, and Figure 5 is a perspective view illustrating a fourth modification.

In carrying out my invention, I provide a connecting rod 1, with the usual wrist pin connection at the upper end, by means of which the connecting rod is joined to the piston of an engine in a manner that is so obvious as not to require illustration. Instead of making the crank pin end 3 (see Fig. 4) solid with the connecting rod, as is now the universal practice, this crank pin end is pivotally mounted on the connecting rod by a flexible joint.

This flexible joint can be made in a variety of ways, some of which are illustrated in the drawings. The purpose of this flexible joint is to enable the automatic alining of the connecting rod with the cylinder, when the crank shaft becomes warped either by the effect of heat or becomes disalined with the engine cylinders by reason of the whipping thereof at high speeds.

By reference to Figures 1 and 2, it will be observed that the connecting rod 1 and the crank pin end are jointed to compensate for the warping of the crank shaft. Neither of these joints directly constitute parts of the connecting rods, but it will be observed at once that with this arrangement, not only the vertical flexing of the crank shaft is compensated for, but also lateral flexing thereof.

Referring briefly to the two modifications referred to, in Figure 1 the connecting rod pin end carries a bearing 9 which is spherical in the middle, and includes annular ribs or stops 10 at the ends, the bearing 9 is prevented from revolving in the connecting rod by constructing it with straight sides as shown at $b$ in Figure 3.

In Figure 2, the crank pin itself is of a globular or spherical shape, and the connecting rod carries a bearing 11 made of a corresponding shape to which the crank pin is applied as shown.

The modification in Figure 4 comprises the crank pin end 3 which includes retainers 13. These are arranged in such a way as to form a bearing for the circular head 14 on the lower end of the connecting rod 1 and stops for limiting the movement of the latter in the axial direction of the crank pin.

Although the construction in this form of the invention is different from that in Figures 1 and 2, the same principle is adhered to. In assembling this construction, the circular head is simply introduced side-wise into the circular bearing of the retainers 13. End retaining caps may be applied if found desirable or necessary, in most cases the bolt heads can be made to act as retainers to keep the parts in place.

The modification in Figure 5 is very much on the order of that in Figure 4. Here, retainers 15 corresponding to those 13 in Figure 4, are arranged to provide an arcuate passage 16 in which the arc-shaped head 17 on the lower end of the connecting rod 1 operates.

The advantages of the invention will become more apparent after a consideration of the following. It has been found in actual practice, that a crank shaft that will perform perfectly in a balancing machine, will not do so in an engine. This is easily explained if we keep in mind the fact that a shaft when running in a balancing machine is not subject to the sudden impulses which are a necessary evil inherent to the reciprocating engine.

Owing to the sudden impulses, particularly in an internal combustion engine, the torque on the crank pin may at intervals be many times more than the torque indicated on the dynamometer. The jerking movement that takes place after each explosion in the cylinder, means distortion of the crank shaft, for it is a very well known fact that when the periodicity of vibration synchronizes with the explosions, the crank shaft tends to develop a "whipping" or springing action.

As the explosive impulses of an internal combustion engine are proportional to the square of the cylinder bore, an engine of only 3¾ inches bore and ordinary compression, will offer a resistance of about 260 pounds to the crank pin as it ascends on the compression stroke.

When the piston reaches the limit of compression, and the explosion takes place, the pressure rapidly rises until it reaches about two tons. This pressure will in effect be in a different direction on the crank pin by reason of its having turned to a different position. It is therefore to be expected that the sudden fluctuations in the direction of the load will be accompanied by a deflection of the crank shaft, it therefore becomes obvious that a strong tendency develops to throw the piston out of alinement with the cylinder walls.

It is to be kept in mind that any deflection or bad alinement of the crank shaft will be multiplied by the length of the connecting rod, so that under certain circumstances, the connecting rod will be forced to take a bending stress, for which it is not designed. If the connecting rod is once bent, it becomes considerably weaker and an unusually heavy explosive impulse may cause the connecting rod to buckle to such an extent as to greatly distort the position of the piston in the cylinder.

This will cause the cylinder wall to be scored and thus do great damage. In conclusion, it will be understood that by providing a joint in the connecting rod, as proposed, all of the existing evils above outlined are entirely overcome, and it is found incidently, that vibration originating in the main bearings or crank shaft, will not be transmitted to the piston and cylinder walls when the flexible joint is used, and a much lighter connecting rod can be employed because the joint above referred to will compensate for many of the unusual conditions ordinarily encountered and outlined above, thereby making it possible to construct the connecting rod very light between the joint and piston.

While the construction and arrangement of the connecting rod as herein described and claimed, is that of a generally preferred form, obviously modifications and changes may be made without departing from the spirit of the invention or the scope of the claims.

I claim:—

1. A connecting rod including a socket crank pin end, and a spherical crank pin bushing operating in said socket, including laterally positioned annular strengthening ribs capable of acting as abutments for the adjacent socket edges.

2. A swivel connecting rod mounting, comprising a bushing-bearing turnable on a crank pin, said bearings having a spherical contour to fit a similar socket bounded by annular strengthening and abutable end ribs with means, including a flattened place, preventing relative forward turning in such socket but permitting curvilinear shifting of the socket in the directions of the ribs.

3. The combination, of a crank pin and a connecting rod with a head having a spherical opening and a flattened place; and a bearing freely turnable on the crank pin, said bearing having a spherical body ending in end ribs, on and between which the head may move laterally, and having a flattened place to contact the flattened place in the opening, to prevent relative forward turning of the head on said body.

4. A device as described, comprising a connecting rod and crank pin bearing, a ball and socket-like connection between the two, and ribs on one of the latter to be engaged by the other.

5. A connecting rod including a socket crank pin end, and a spherical crank pin bushing operating in said socket, including laterally positioned annular strengthening ribs.

JOHN E. CROWELL.